United States Patent [19]

Hewitt

[11] 3,814,909

[45] June 4, 1974

[54] ELECTRONIC RANDOM-ACCESS SLIDE PROJECTOR CONTROLLER

[75] Inventor: Terry L. Hewitt, Schenectady, N.Y.

[73] Assignee: General Electric Company, Schenectady, N.Y.

[22] Filed: Feb. 26, 1973

[21] Appl. No.: 335,595

[52] U.S. Cl....... 235/92 MP, 235/92 R, 235/92 LG, 235/61.11 E

[51] Int. Cl. ............................................ G06m 3/02

[58] Field of Search ..... 235/92 MP, 92 CC, 92 MB, 235/61.11 E

[56] References Cited

UNITED STATES PATENTS

| | | | |
|---|---|---|---|
| 2,482,242 | 9/1949 | Brustman | 235/61.11 E |
| 2,902,329 | 9/1959 | Brink | 235/61.12 M |
| 3,034,643 | 5/1962 | Keller | 209/74 |
| 3,700,320 | 10/1972 | Brewer | 235/61.11 E |
| 3,731,060 | 5/1973 | Weinstein | 235/61.11 E |

*Primary Examiner*—Paul J. Henon
*Assistant Examiner*—Robert F. Gnuse
*Attorney, Agent, or Firm*—Louis A. Moucha; Joseph T. Cohen; Jerome C. Squillaro

[57] ABSTRACT

The controller includes multi two-input exclusive-OR gates having first inputs supplied with a two-digit BCD-coded signal representing the desired number of a slide to be selected for viewing in a random-access slide projector. Second inputs to the OR gates are connected to outputs of base 10 "tens" and "ones" counters which count clock pulses in response to a START command signal. Coincidence of the inputs to the OR gates causes a control logic circuit to terminate the generation of the clock pulses which are also counted by two N base (other-than-10) counters. The N base corresponds to the number of rows or columns in a code matrix used to specify the slide numbers. The outputs of the two N base counters are supplied to two one-of-N decoders each of which provides one output signal that identifies the particular row and column in the code matrix which specifies the desired slide location. Interface circuits at the outputs of the decoders provide the proper voltage level of voltage signals applied to the projector mechanism for searching the projector slide tray for the desired slide.

11 Claims, 3 Drawing Figures

Figure 1:
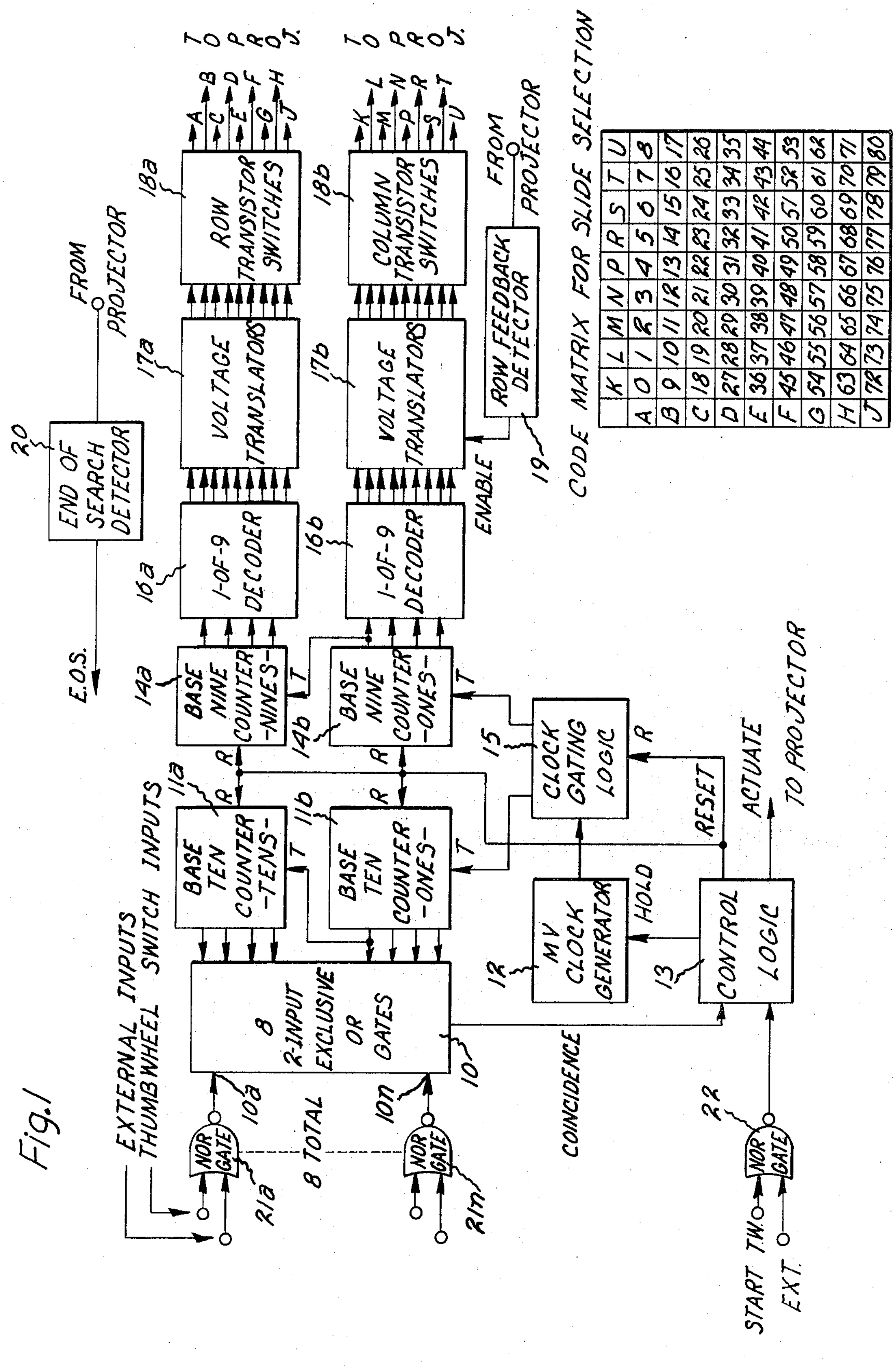

| | K | L | M | N | P | R | S | T | U |
|---|---|---|---|---|---|---|---|---|---|
| A | 0 | 1 | 2 | 3 | 4 | 5 | 6 | 7 | 8 |
| B | 9 | 10 | 11 | 12 | 13 | 14 | 15 | 16 | 17 |
| C | 18 | 19 | 20 | 21 | 22 | 23 | 24 | 25 | 26 |
| D | 27 | 28 | 29 | 30 | 31 | 32 | 33 | 34 | 35 |
| E | 36 | 37 | 38 | 39 | 40 | 41 | 42 | 43 | 44 |
| F | 45 | 46 | 47 | 48 | 49 | 50 | 51 | 52 | 53 |
| G | 54 | 55 | 56 | 57 | 58 | 59 | 60 | 61 | 62 |
| H | 63 | 64 | 65 | 66 | 67 | 68 | 69 | 70 | 71 |
| J | 72 | 73 | 74 | 75 | 76 | 77 | 78 | 79 | 80 |

ELECTRONIC RANDOM-ACCESS SLIDE PROJECTOR CONTROLLER

My invention relates to an electronic unit used in conjunction with a random-access slide projector for providing selection of a desired slide for viewing in the projector, and in particular, for providing selection of the slide by means of a local switch that is operated manually or by means of a computer for automatic control requiring no human intervention.

Prior art controllers for random-access slide projectors all utilize manual selectors which, as one example, comprise a rotary switch assembly. Other comparable slide addressing devices utilize similar mechanical switching arrangements none of which provide for electronic control of the slide selection, and all of which require manual control. It would obviously be desirable to eliminate the need for a human operator in the slide selection process by utilizing an electronic random-access slide projector controller which would be compatible with computer control, or at least, to provide a simple mechanical switch in the electronic controller which minimizes the amount of manual manipulation required in the slide selection.

Therefore, one of the principal objects of my invention is to provide an electronic controller for a random-access slide projector which may not require manual control for the slide selection operation.

Another object of my invention is to provide the controller with a plurality of inputs whereby the slide selection may be accomplished by external electrical signals or by a local switch which is an element of the controller.

A further object of my invention is to provide the controller with capability for undergoing the slide selection operation either by a simple selector switch or completely under the control of a computer or similar control device.

Briefly summarized, and in accordance with the objects of my invention, I provide an electronic controller for a random-access slide projector, and which includes multi two-input exclusive-OR gates having first inputs supplied with a signal encoded in binary coded decimal which represents the desired number of the slide to be selected for viewing in the projector. The second inputs to the exclusive-OR gates are supplied from base 10 "tens" and "ones" counters which count clock pulses that are generated after a START command signal is applied to the controller. Coincidence of the two inputs to the exclusive-OR gates provides a signal to a control logic circuit for terminating the generation of the clock pulses in a clock generator which also provides the pulses to two counters which count in a base N other-than10 for compatability with a code matrix used to specify the slide numbers, the ones counter of the latter counters being associated with the columns in the code matrix and the other ("N*S*") counter associated with the matrix rows. The outputs of the base N ones and *Ns* counters are respectively connected to first and second one-of-N decoders each having N outputs corresponding to N columns and rows in the code matrix. The outputs of the decoders are connected to voltage translators and transistor switches for applying voltages of the appropriate level to the projector slide searching mechanism, the particular decoder outputs providing a signal defining the particular column and row location in the code matrix which specifies the desired slide.

Figure 2A:
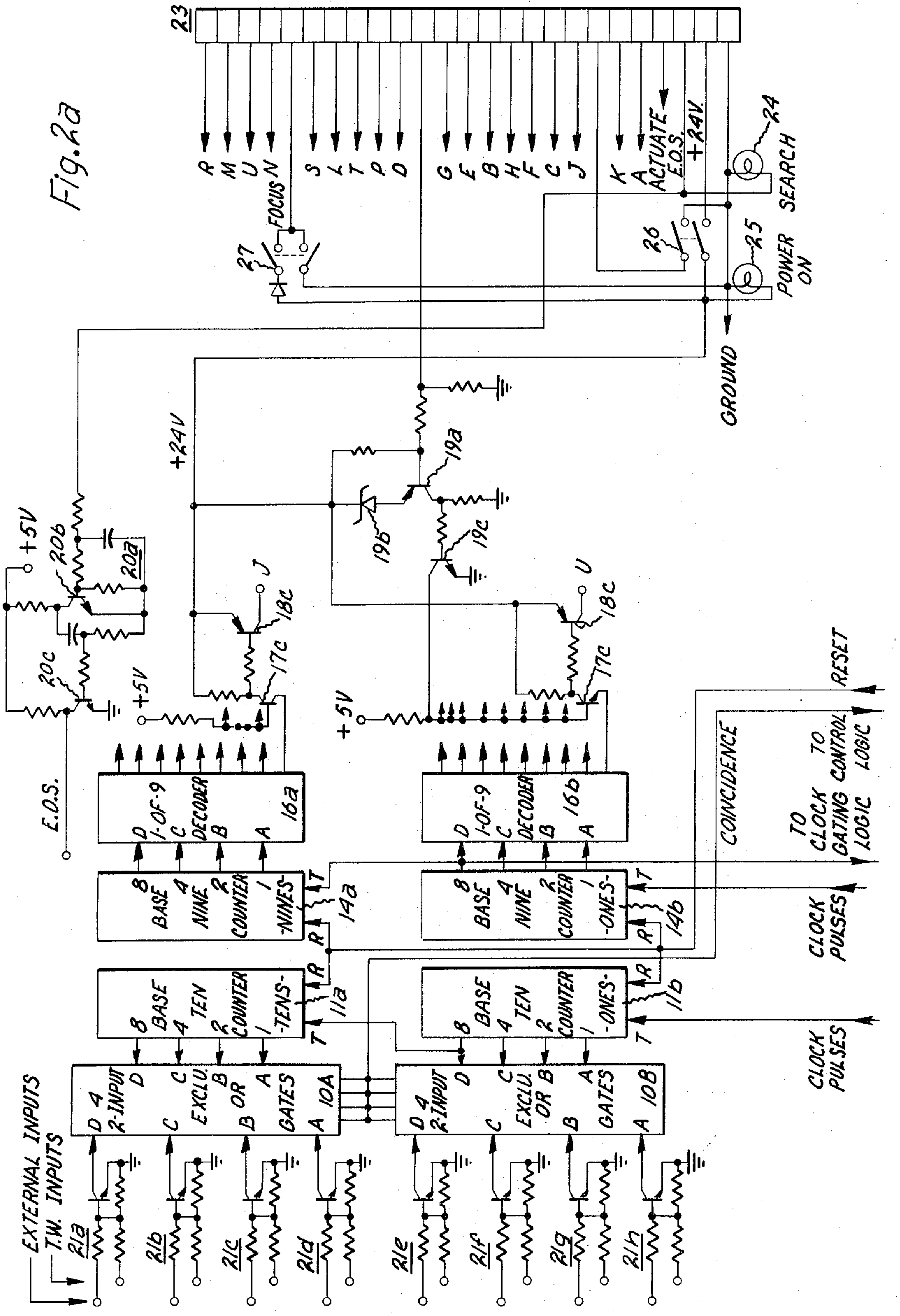
Figure 2B:
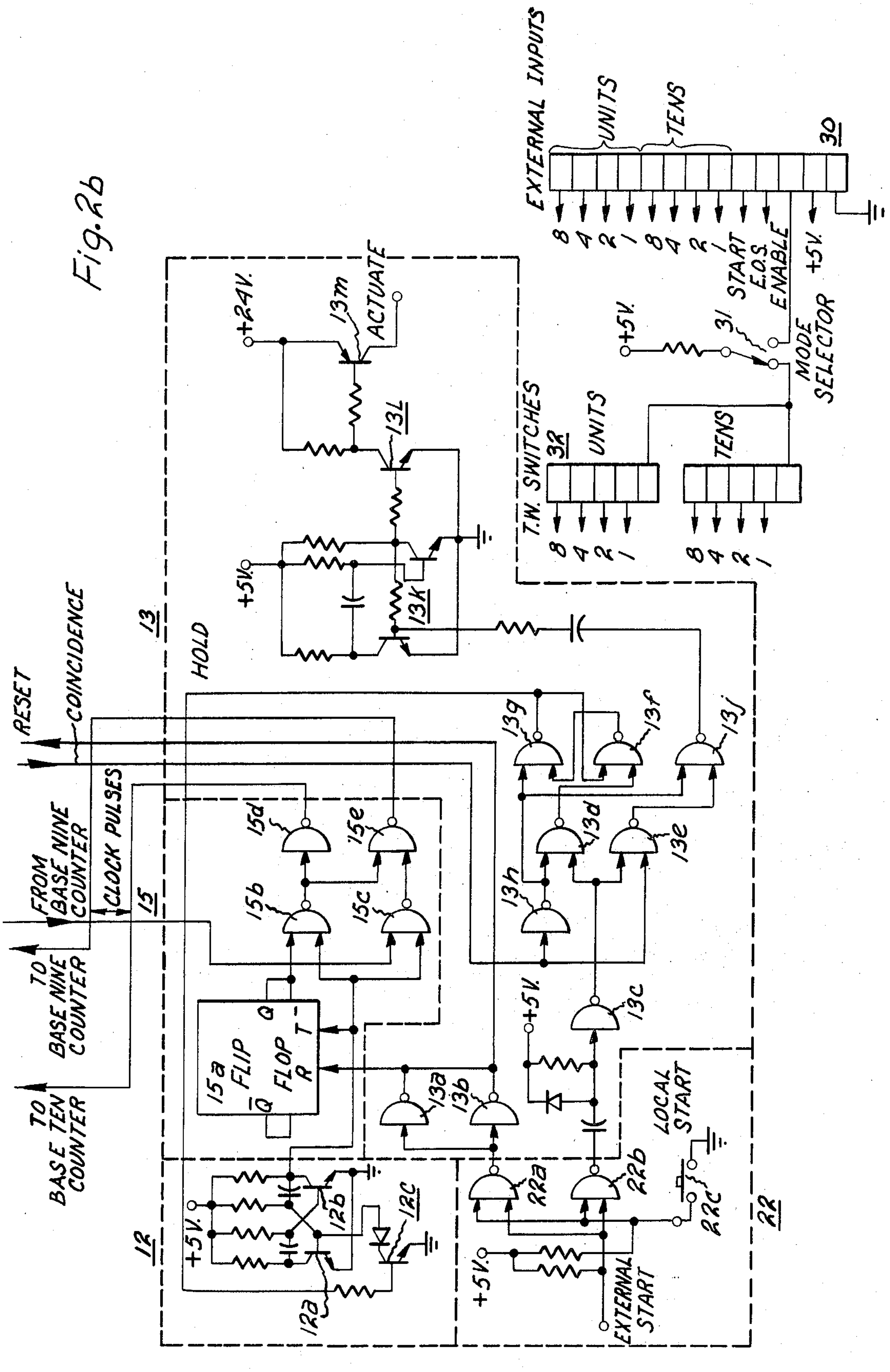

The features of my invention which I desire to protect herein are pointed out with particularity in the appended claims. The invention itself, however, both as to its organization and method of operation together with further objects and advantages thereof may best be understood by reference to the following description taken in connection with the accompanying drawings wherein like parts in each of the several figures are identified by the same reference character, and wherein:

FIG. 1 is a block diagram of a specific embodiment of a random-access projector controller in accordance with my invention; and FIGS. 2*a* and 2*b* are schematic diagrams of the controller shown in block diagram form in FIG. 1.

Referring now in particular to FIG. 1, there is shown in block diagram form the components of my electronic controller which is utilized in conjunction with a random-access slide projector for selecting a desired slide to be viewed in the projector. The input components of my projector controller are multi two-input exclusive-OR gates 10 having a plurality of first inputs 10*a–n* that are adapted to be supplied with a two-digit input signal encoded in binary coded decimal (BCD) which represents the desired number of a slide to be selected for viewing in the projector. Second inputs to OR gate 10 are provided from the outputs of two interconnected base 10 counters 11*a* (the ones counter) and 11*b* (the tens counter) which count clock pulses applied to the trigger (T) inputs thereof. The clock pulses are applied to counters 11*a* and 11*b* until there is coincidence of the clock pulse count applied to the second inputs of the exclusive-OR gates 10 with the slide identification signal applied to the first inputs. At such time (of coincidence), the tens and ones base 10 counters 11*a* and 11*b* have stored therein counts corresponding to the desired slide number identified by the two-digit BCD signals applied to the first inputs 10*a–n* of exclusive OR gates 10.

The clock pulses are generated in a multivibrator type clock generator 12 which is controlled by means of a control logic circuit 13 that determines the time at which the clock pulse generation begins and ends. In the quiescent condition, a HOLD signal from the control logic circuit 13 is applied to clock generator 12 for maintaining it in a state wherein no output clock pulses are produced. After the desired slide number input signal is applied to the first inputs 10*a–n* of exclusive-OR gates 10, a START command signal is applied to a first input of control logic circuits 13 for initiating operation of the projector controller. The initial portion of the START command signal causes control logic 13 to provide a RESET signal to the base 10 counters 11*a* and 11*b* as well as to an interconnected pair of base other-than-10 counters 14*a* and 14*b* which resets the counters to zero. At the trailing edge of the START command signal, the RESET signal is removed from the counters and the HOLD signal is removed from the clock generator 12 to cause the multivibrator to begin producing clock pulses which are applied to the trigger inputs of the ones counters 11*b* and 14*b*. The clock pulses have a fixed repetition rate and are applied to the trigger inputs of the counters by means of a clock gating logic circuit 15 which alters the number of clock pulses supplied to the base other-than-ten counter 14*b* relative to the number of pulses supplied to counter 11*b* in order to convert the base 10 to the base other-than-10 employed with counters 14*a*, *b*. When coincidence occurs between the BCD-coded slide number input signal applied to the first inputs 10*a–n* of the exclusive-OR gates 10 and the outputs of the base ten counters 11*a* and 11*b* applied to the second inputs of the exclusive-OR gates, the output of exclusive-OR gates 10 goes high and this signal is applied to the control logic 13 to restore the HOLD signal applied to clock generator 12 and thereby stop the counting process in counters 11*a*, 11*b*, 14*a* and 14*b*. The count thus stored in the base other-than-ten counters 14*a*, 14*b* is such base equivalent of the desired decimal slide number. The outputs of counters 14*a* and 14*b* are respectively connected to the inputs of one-of-base-other-than-10 decoders 16*a* and 16*b*. The only one activated output of each decoder provides a signal corresponding to the location of the desired slide in a code matrix which specifies the slide numbers in the slide tray in the projector. Decoders 16*a* and 16*b* each have a plurality of outputs corresponding to the number of rows and columns in the code matrix, and which is equal to the number base-other-than-10. The outputs of decoders 16*a* and 16*b* which may be herein described as the row and column decoders, respectively, are connected to inputs of a corresponding number of voltage translators 17*a* and 17*b* which may also be identified as row and column voltage translators, and are generally required to increase the voltage from the low level used in the logic circuitry to the higher level for interacting with the projector slide search mechanism. The outputs of the voltage translators 17*a* and 17*b* are respectively connected to inputs of a corresponding number of transistor switches 18*a* and 18*b* which may also be respectively identified as row and column transistor switches and function to switch the required higher voltage to the appropriate conductors which interconnect the projector controller and the projector slide search mechanism. The number of inputs and outputs of each of the transistor switches 18*a*, 18*b* are also equal to the number base-other-than-10. The voltage translators and transistor switches thus function to interface the decoder outputs to the projector.

At the time that the clock generator 12 is stopped (due to the HOLD signal being reapplied thereto from the control logic 13), an ACTUATE pulse signal is generated in the control logic 13 and is supplied to the projector to initiate operation thereof. Search for the desired slide in the projector slide tray then proceeds in a conventional manner in which the high voltage on the one particular activated output conductor of transistor switches 18*a* maintains search for the correct row in the slide code matrix in which the desired slide is located. After the correct row has been found, a feedback signal is developed in the projector and is applied to a feedback detector circuit 19 in my controller which detects such signal and provides an ENABLE signal to the column voltage translators 17*b*. The ENABLE signal causes the appropriate one of voltage translators 17*b* to provide an output to the associated one of transistor switches 18*b* which switches the high voltage to the appropriate projector-interconnecting conductor for searching out the correct column in the code matrix. While the correct slide is being searched for, an end-of-search detector 20 in the controller is supplied with a "search" voltage from the projector and produces an output end-of-search (EOS) pulse which indicates when the slide selection operation has been completed.

A specific example of my electronic random-access slide projector controller will now be described for use with a Kodak Carousel RA–950 or RA–960 projector manufactured by the Eastman Kodak Company. This particular projector utilizes a rotary slide tray having 81 slide positions. A nine × nine code matrix format may be used in specifying a slide number where the location in the matrix is equivalent to counting in base nine and thus the base-other-than-10 mentioned hereinabove becomes base nine when employed with Kodak RA–950 or RA–960 projector. The clock gating logic 15 introduces an additional clock pulse to base nine ones counter 14*b* for each nine clock pulses applied to base ten ones counter 11*b* to thereby convert base 10 to base nine. My projector therefore first converts the input decimal information consisting of two-digit 8421 BCD-coded signals into a base nine format by having counters 14*a* and 14*b* function as base nine counters and the outputs thereof are connected to inputs of one-of-nine decoders 16*a* and 16*b*. Nine outputs of each decoder are respectively connected to corresponding nine inputs of voltage translators 17*a* and 17*b* and the nine outputs thereof are connected to nine inputs of each of the transistor switches 18*a* and 18*b*. The nine outputs of the two transistor switches 18*a* designated A, B, C, D, E, F, G, H, J are connected to nine cnductors (which may be part of a 25-conductor cable to be mentioned hereinafter) which interconnect the transistor switches 18*a* outputs with corresponding nine inputs in the projector for interacting with the mechanism in the projector which searches the rows in the nine × nine code matrix. In like manner, the nine outputs of the column transistor switches 18*b* designated K, L, M, N, P, R, S, T, U are connected to nine other conductors (which may also be part of the 25-conductor cable) which interconnect the transistor switches 18*b* output with corresponding nine other inputs in the projector for interacting with the mechanism in the projector which searches the columns in the slide tray matrix designation.

I also provide a feature which permits addressing my projector controller by more than one means. In particular, the slide selection address may be accomplished by a two-digit thumbwheel or equivalent switch which is part of the controller, or by external electrical two-digit BCD-coded inputs which may be provided from a computer or similar electronic source. This latter capability makes available random-access slide selection without requiring the intervention on the part of a human operator. My projector controller thus replaces a manual selector presently utilized on the Kodak RA–950 or RA–960 porjector and consisting of a specially designed rotary switch assembly which is operated manually by a human operator. The thumbwheel switch may be included as part of my controller, but may be remotely located, if desired. The external electronic and thumbwheel switch (slide number identification) inputs are supplied to eight NOR gates 21*a–n* wherein each gate is supplied with one input from the external electronic input signal source which may be a computer and one input from the thumbwheel switch. The eight outputs of the eight NOR gates 21*a–n* are supplied to corresponding eight first inputs 10*a–n* of the exclusive-OR gate 10. The START command signal is applied to the inputs of NOR gate 22 and is provided either by a push button or other suitable switch associated with the thumbwheel switch (TW) for initiating operation of my controller or in the case of external control is provided by a suitable external logic signal. The START command external logic signal could be part of a computer program for controlling the projector and would follow the electrical two-digit BCD slide number address input signals applied to NOR gates 21*a–n*. The external logic signals thus consist of two-digit 8421 BCD-coded parallel input signals plus a START command signal. My controller thus has capability for the operation of the RA–950 or RA–960 projector by electronic means rather than requiring manual selection and such capability may be obtained by computer control. Alternatively, manual slide selection may be employed by utilizing the thumbwheel switch. The basic function of my projector controller is thus conversion of a conventional two-digit BCD coded input into a format which can be utilized by the projector and to provide the switching operations necessary at the projector interface.

Referring now to the schematic diagrams in FIGS. 2*a* and 2*b*, there are illustrated the details of the components indicated in block diagram form in FIG. 1. in particular, FIG. 2 illustrates the details of the NOR gate 21*a–n*, exclusive-OR gate 10, base 10 and base nine counters, decoders 16*a*, *b*, voltage translators 17*a*, *b*, transistor switches 18*a*, *b*, row feedback detector 19 and end-of-search detector 20 components designated in FIG. 1. FIG. 2*b* illustrates the details of the multivibrator clock generator 12, control logic 13, clock gating logic 15 and NOR gate 22 components.

Referring now to FIG. 2*a*, the 8 NOR gates 21*a–h* each include two input resistors for the external or thumbwheel switch input signals and a third resistor connected across the emitter and base electrodes of an NPN transistor. The eight two-input exclusive-OR gates 10 are actually a pair of four two-input exclusive-OR gates which as one example may be of the MC1812P type. The ABCD first inputs of the first exclusive-OR gates 10A are respectively connected to the outputs of NOR gates 21 *d*, *c*, *b* and *a*. In like manner, the ABCD first inputs of exclusive OR gates 10B are respectively connected to the outputs of NOR gates 21 *h*, *g*, *f* and *e*. The ABCD second inputs of exclusive-OR gates 10A are connected to the outputs of the base 10 tens counter 11*a* and the corresponding second inputs of the exclusive-OR gates 10B are connected to outputs of the base 10 ones counter 11*b*. The base 10 and base nine counters 11*a*, *b* and 14*a*, *b* may each be of the type MC838F. The one-of-nine decoders 16*a*, *b* may be of the type SN7442N and the ABCD inputs thereof are connected to the outputs of the base nine counters. The nine outputs of each decoder 16*a* and 16*b* are each connected to a voltage translator which consists of a transistor 17*c* of the 2N3853A type as one example, having its emitter electrode connected to the output of the decoder and its base electrode connected to a common buss supplied with +5 volts common to all of the logic circuitry in my controller. The collector electrode is connected through a resistor to a common buss supplied with +24 volts by a conductor (which may also be part of the 25-conductor cable) connected to a 25-pin connector 23 which provides interconnection of my controller and the projector. A second resistor is connected between the collector electrode of the voltage translator transistor and the base electrode of PNP transistor 18*c* which functions as one of the transistor switches 18*a*, *b*. The emitter electrode of the transistor switch 18*c* is connected to the +24 volt buss and the collector electrode is the output of the transistor switch with the nine outputs (of switches 18*a*) associated with the rows in the slide code matrix and designated A–J and the nine outputs of the transistor switches 18*b* associated with the columns K–U in the code matrix. Connector 23 has the same letter designations A–U to show the manner of connection of the transistor switch outputs to the connector. The voltage translator and transistor switch circuits, as well as all of the other circuits disclosed hereinafter are of conventional design, and equivalent circuits may obviously be substituted therefore to accomplish the same function.

The row feedback detector circuit 19 includes a first NPN transistor 19*a* having its base electrode connected through a resistor (and a conductor which may also be part of the 25-conductor cable) to the connector 23 for providing the FEEDBACK signal from the projector. The emitter electrode of the first transistor is connected through a zener diode 19*b* to the +24 volt buss and the collector electrode is connected through a resistor to ground. The collector electrode is also connected to a resistor to the base electrode of a second NPN transistor 19*c* which has its emitter electrode grounded and its collector electrode connected to the +5 volts buss. The second transistor 19*c* provides a short circuit to ground for the common resistor to the +5 volt buss supplying the column voltage translator transistors 17*c* such that they are disabled in the absence (low state) of the row feedback signal and are enabled during the high state thereof which ceases conduction of transistor 19*c* to thereby open the short circuit.

The end-of-search detector 20 is an optional circuit and, when employed, consists of a filter circuit 20*a* having its input connected (by means of a conductor which may also be part of the 25-conductor cable) to the connector 23 pin designated EOS for connection to the projector. The lamp 24 designated SEARCH is also connected from the input to the end-of-search detector filter to ground and such lamp remains illuminated during the search operation wherein the projector mechanism is searching first for the correct row and then for the correct column in the slide code matrix. This search operation generates a fluctuating electrical signal and the filter 20*a* is utilized for the purpose of filtering out such search signal fluctuations. At the end of the search operation, the search lamp 24 goes out and the detector portion of circuit 20 which includes a first NPN transistor 20*b* having an R-C network connected across its emitter and collector electrodes detects the end of such search operation due to the voltage change resulting from the search lamp 24 going out. The detected signal is obtained from the juncture of the serially connected resistor and capacitor and is transmitted through a second NPN transistor 20*c* which functions as a pulse generator to provide at the collector electrode thereof the end of search (EOS) signal which is a pulse of about 1 millisecond duration that switches from +5 volts to zero. The EOS pulse may be utilized in a computer control for informing the controlling source that the slide selection operation has been completed. A second lamp 25 designated POWER ON is connected between ground and the +24 volt buss through one arm of a single-pole double-throw switch 26 for indicating that the 24 volts is supplied to both the projector and projector controller. The second arm of switch 26 functions to remotely (i.e., at the controller) switch the A.C. power source into the projector. Finally, a spring-loaded, double-pole, double-throw, center-off mechanical switch 27 has the center position connected via a conductor to connector 23 and the arms connected across the 24 volt buss and ground and is designated FOCUS for remote (i.e., again at the controller) manual control of the lens focussing mechanism in the projector.

All of the outputs of the four two-input exclusive-OR gates 10A and 10B are interconnected, and the COINCIDENCE signal (voltage state going high to +5 volts) is supplied to the control logic circuit 13 for reapplying the HOLD signal to the clock generator 12 and thereby stopping the generation of clock pulses due to the achievement of the coincidence of the counter clock pulses with the two digit BCD-coded slide number input signal.

Referring now to FIG. 2*b*, the NOR gate 22 illustrated in FIG. 1 actually includes two NAND gates 22*a* and 22*b* (which provide the NOR function) each provided with inputs for alternately entering the START command signal from an external input such as a computer control or by means of a pushbutton 22*c* associated with the local thumbwheel switch inputs. The output of NAND gate 22*a* is connected to the inputs of a pair of parallel connected inverters 13*a* and 13*b* in the control logic circuit. A first output of inverters 13*a*, *b* is connected to the reset (R) input of a flip-flop 15*a* in the clock gating logic circuit and a second output is connected to the reset input of all of the base nine and base 10 counters. The output of NAND gate 22*b* is connected to the input of an inverter 13*c* in the control logic through an intermediate resistor-capacitor differentiator circuit which detects the trailing edge of the START command signal to cause removal of the HOLD signal from the multivibrator 12. The output of inverter 13*c* is connected to first inputs of NAND gates 13*d* and 13*e* and the output of NAND gate 13*d* is connected to a first input of NAND gate 13*f*. The output of NAND gate 13*f* is connected to a first input of NAND gate 13*g* having a first output which provides the HOLD signal to multivibrator 12 and a second output connected to a second input of NAND gate 13*f*, where NAND gates 13*f* and 13*g* comprise what is conventionally known as an RS flip-flop. The output of exclusive OR-gates 10 which provides the COINCIDENCE signal is connected to the input of an inverter 13*h* and also to the second input of NAND gate 13*e*. The output of inverter 13*h* is connected to a second input of NAND gates 13*d*, 13*g* and a first input of NAND gate 13*j*. The circuit including elements 13*c–h* thus detects the trailing edge of the START command pulse and thereby removes the HOLD signal applied to the multivibrator 12, and at coincidence of the BCD-coded slide number input and base 10 counter output signals in exclusive-OR gate 10, the HOLD signal is reapplied to the multivibrator for preventing generation of any further clock pulses. The output of NAND gate 13*e* is connected to a second input of NAND gate 13*j* and the output thereof is connected to the input of a monostable multivibrator (one-shot switching circuit) 13*k* which provides the ACTUATE pulse signal to the projector at the time the clock generator has the HOLD signal reapplied thereto. The output of the one-shot switching circuit 13*k* is connected to a voltage translator circuit 13*l* for changing the voltage level of the ACTUATE pulse from 5 volts to 24 volts for utilization by the projector. The output of the voltage translator is connected to a transistor switch 13*m* having the collector electrode thereof connected to connector 23 for providing the 24 volt ACTUATE pulse to the projector. The voltage translator 13*l* and transistor switch 13*m* circuits are identical to the corresponding elements in FIG. 2*a*.

Clock generator 12 consists of an astable multivibrator consisting of a two-stage amplifier 12*a*, *b* with positive feedback and also includes a switching transistor and diode circuit 12*c* which has its input connected from the output of NAND gate 13*g* and its output connected to the base electrode of transistor 12*a* for inhibiting operation of the astable multivibrator by effectively grounding the base of transistor 12*a* when the input to transistor 12*c* is high. The output of multivibrator 12 is connected to the trigger input of flip-flop 15*a* in the clock gating logic circuit as well as to first inputs of NAND gates 15*b* and 15*c*. The Q output of flip-flop 15*a* is connected to a second input of NAND gate 15*b* and the D (most significant digit) output of the base nine counter 14*b* is connected to the second input of NAND gate 15*c*. The output of NAND gate 15*b* is connected to the input of an inverter 15*d* and to a first input of NAND gate 15 *e*. The output of NAND gate 15*c* is connected to the second input of NAND gate 15*e* and the output thereof is connected to the trigger input of base nine ones counter 14*b*. The output of inverter 15*d* is connected to the trigger input of the base 10 ones counter 11*b*. Thus, the outputs of elements 15*d* and 15*e* supply the clock pulses to the base 10 and base nine counters, respectively, and the connection from the D output of the base nine ones counter 14*b* to NAND gate 15*c* causes one extra trigger pulse to be supplied to the base nine counter, which is not supplied to the base 10 counter, for each nine counts thus effectively converting a normal decade counter integrated circuit into a nines counter. The function of flip-flop 15*a* is to provide an alternating input to one input of NAND gate 15*b* which, when combined with the other inputs to NAND gates 15*b* and 15*c* in the logical combination shown, results in the 10 trigger pulses from NAND gate 15*e* to the base nine counter for every nine trigger pulses from NAND gate 15*d* to the base 10 counter.

A 13-pin connector 30 is utilized for applying external two-digit 8421 BCD-coded slide number input signals to NOR gates 21*a–h*. In particular, the 8, 4, 2 and 1 units inputs are respectively applied to the D, C, B and A inputs of exclusive-OR gates 10B by means of the associated transistors 21*e–h* and the 8, 4, 2 and 1 tens inputs are respectively applied to the D, C, B and A inputs of exclusive-OR gates 10A. The connector 30 also provides the extenral START command signal to the external (EXT.) START terminal in the NOR gate 22 circuit. The end-of-search EOS signal developed at the output of detector 20 is supplied to the appropriate pin of connector 30 for providing such EOS signal to the computer or other type remote control unit. Another pin of the connector designated ENABLE is connected to a mode selector switch 31 which in a first position provides +5 volts to the logic circuitry utilized in the external source, such as a computer, which generates the two-digit 8421 BCD-coded input signals and START signal. In the second position of switch 31 as indicated in FIG. 2*b*, the +5 volts is applied to the thumbwheel (TW) switches for local generation of the two-digital 8421 BCD-coded slide number input signals applied to exclusive-OR gates 10. The 8, 4, 2 and 1 units inputs and the 8, 4, 2 and 1 tens inputs to NOR gates 21*a–h* are connected from the thumbwheel switches to the second inputs of the NOR gates 21*a–h* in the same sequence as the external input signals. Selector switch 31 therefore enables either the thumbwheel switches 32 or the external input source by means of connector 30 for supplying the slide number input signals to the exclusive-OR gates 10.

From the foregoing description, it can be appreciated that my invention meets the objectives set forth in that it makes available an electronic controller for a random-access slide projector which has the capability of not requiring any manual control by a human operator in one mode of operation of the controller. The controller is capable of being provided with a plurality of inputs whereby the slide selection may be accomplished by externally generated signals such as from a computer control or by a local switch which is an element of the controller.

Having described my invention, it is believed obvious that modification and variation of my invention is possible in light of the above teachings. Thus, the various disclosed circuits in the controller may be replaced by other logic type circuits which accomplish the same function. Although my invention is disclosed specifically with reference to a nine × nine matrix for slide selection, it should be evident that other size matrices may also be employed. Thus, in the event that the code matrix is greater or less than nine × nine, the counters 14*a, b* and decoders 16*a, b* are changed to the appropriate base number and a number of conductors interconnecting the voltage translators and transistor switches are also similarly changed. The clock gating logic circuit 15 would also be provided with the proper logic to change the number of clock pulses applied to counter 14*b* for the case wherein the code matrix is other than nine × nine. Also, it should be evident that other logic means may be utilized for the herein disclosed base nine counters 14*a, b* and clock gating logic circuit 15. Thus, the clock gating logic 15 may be entirely eliminated by fabricating an actual nines counter rather than using a decade counter, as herein, and having it function as a nines counter. Alternatively, a decade or four bit binary counter can be used and the ones counter thereof reset by suitable logic at each count nine. Other logic means could also be used to obtain the base 10-to-base nine conversion. Finally, the single external input to NOR gates 21*a–n* can clearly be changed to a multiplicity of external sources by means of an additional one or more inputs to each NOR gate. It is, therefore, to be understood that changes may be made in the particular embodiment of my invention as described which are within the full intended scope of the invention as defined by the following claims.

What I claim as new and desire to secure by Letters Patent of the United States is:

1. An electronic random-access slide projector controller comprising multi two-input exclusive-OR gates having first inputs adapted to be supplied with an input signal encoded in binary coded decimal and representing the desired number of a slide to be selected for viewing in a random-access slide projector, means for applying a START command signal to the slide projector controller for initiating operation thereof, a clock generator for producing clock pulses in response to the START command signal, said clock generator maintained in an inactive state prior to the START command signal, control logic means having a first input connected to an output of said START command signal applying means and having a first output connected to an input of said clock generator for applying a HOLD signal thereto which maintains said clock generator in the inactive state in which no clock pulses are produced at the output thereof, first and second counter means each having a reset input connected to a second output of said control logic means for resetting said first and second counter means to zero in response to the START command signal, said first and second counter means each also having a trigger input connected to an output of said clock generator for counting the clock pulses after the counter means have been reset to zero, the end of the START command signal removing the HOLD signal from said clock generator so as to cause the clock pulses to be supplied to said first and second counter means, said first counter means adapted to count the clock pulses in base 10, said second counter means adapted to count the clock pulses in a base other than 10 to provide compatibility with a code matrix used to specify a slide number for location identification of the slides stored in the projector slide tray, outputs of said first counter means connected to second inputs of said multi two-input exclusive-OR gates coincidence between the signals applied to the first and second inputs of said multi two-input exclusive-OR gates causing outputs thereof to produce a signal applied to a second input of said control logic means which causes the first output thereof to again apply the HOLD signal to said clock generator so as to stop the counting operation of said first and second counter means, the count stored in said second counter means at the reapplication of the HOLD signal to said clock generator being the base other-than-ten equivalent of the desired decimal slide number, first one-of-base-other-than-10 decoder means having inputs connected to first outputs of said second counter means for providing a signal at only one particular output of a plurality of outputs of said first decoder means which identifies the row in the code matrix specifying the desired slide number wherein the plurality of outputs is equal in number to the base other-than-10, second one-of-base-other-than-10 decoder means having inputs connected to second outputs of said second counter means for providing a signal at only one particular output of a like plurality of outputs of said second decoder means which identifies the column in the code matrix specifying the desired slide number, first and second means each having a like plurality of inputs connected to the outputs of said first and second decoder means, respectively, for interfacing said first and second decoder means with the projector mechanism which searches for the particular row and column in the code matrix identified by the counts stored in said first and second counter means, and a third output of said control logic means connected to the projector for supplying an ACTUATE signal thereto at the time the HOLD signal is reapplied to said clock generator to initiate the slide search operation of the projector.

2. The electronic random-access slide projector controller set forth in claim 1 and further comprising feedback signal detecting means having an input connected to an output of the projector for detecting a feedback signal generated in the projector when the correct row in the code matrix which specifies the desired slide has been located by the projector slide searching mechanism, output of said feedback signal detecting means connected to an ENABLE input of said second interfacing means for enabling said second interfacing means so as to cause the projector mechanism to search and select the appropriate column in the code matrix which specifies the desired slide.

3. The electronic random-access slide projector controller set forth in claim 1 wherein said first and second interfacing means each comprise a like plurality of voltage translators having inputs respectively connected to the outputs of the decoder means for increasing the voltage level of the decoder output signal to a level required by the projector slide searching mechanism, and a like plurality of transistor switches having inputs respectively connected to corresponding outputs of said voltage translators and having outputs connected to the projector slide searching mechanism, the voltage translators associated with the rows in the code matrix being constantly enabled so as to immediately provide a signal to the projector upon the first decoder means providing an output signal for searching and selecting the row in the code matrix which specifies the desired slide, the voltage translators associated with the columns in the code matrix being enabled only in response to an ENABLE signal supplied thereto after the proper row has been selected.

4. The electronic random-access slide projector controller set forth in claim 1 and further comprising means connected to an output of the projector slide searching mechanism for detecting a signal generated thereby upon the mechanism having selected the proper column in the slide matrix and thereby having ended the search for the desired slide, output of said end-of-search detector means providing a signal to indicate that the desired slide has been selected by the projector slide search mechanism.

5. The electronic random-access slide projector controller set forth in claim 1 and further comprising a plurality of NOR gates of number equal to the number of said two-input exclusive-OR gates, said NOR gates having first inputs adapted to be supplied with a two-digit input signal encoded in binary coded decimal from a local source, and said NOR gates having second inputs adapted to be supplied with a two-digit input signal encoded in binary coded decimal from an external input signal source such as a computer for automatic control requiring no human intervention, the binary coded decimal signal representing the desired number of the slide to be selected for viewing in the projector.

6. The electronic random-access slide projector controller set forth in claim 5 wherein said START command signal applying means provides the function of a NOR gate having a first input connected to a locally located switch and a second input connected to the source of external input signals for initiating operation of the controller remotely, the START command signal preceding the two-digit encoded input signal.

7. The electronic random-access slide projector controller set forth in claim 1 and further comprising clock gating logic circuit means having a first input connected to an output of said clock generator and a second input connected to an output of said control logic means and a third input connected to an output of said second counter means for converting the number of pulses produced by said clock generator that are applied to said second counter means to a number which results in said second counter means counting the clock pulses in the base other-than-10.

8. The electronic random-access slide projector controller set forth in claim 1 wherein said multi two-input exclusive-OR gates are eight in number.

9. The electronic random-access slide projector controller set forth in claim 1 wherein said second counter means is adapted to count the clock pulses in base nine, said first and second one-of-base-other-than-10 decoder means being first and second one-of-nine decoders each having nine outputs, and said first and second interfacing means each having nine inputs and nine outputs and the code matrix is in a nine × nine format.

10. The electronic random-access slide projector controller set forth in claim 9 wherein said first counter means comprises a base 10 tens counter having outputs connected to the second inputs of said multi two-input exclusive-OR gates to which are applied the tens digits of the input signal encoded in binary coded decimal, and a base 10 ones counter having outputs connected to the second inputs of said exclusive OR-gates associated with the units digits of the input signal, the most significant output of said base 10 ones counter connected to the trigger input of said base 10 tens counter.

11. The electronic random-access slide projector controller set forth in claim 10 wherein said second counter means comprises a base nine nines counter having the first outputs thereof connected to inputs of said first one-of-nine decoder, a base nine ones counter having the second outputs thereof connected to inputs of said second one-of-nine decoder, the most significant output of said base nine ones counter connected to the trigger input of said base nine nines counter, and clock gating logic circuit means having a first input connected to an output of said clock generator and a second input connected to an output of said control logic means and a third input connected to the most significant output of said base nine ones counter for converting the number of pulses produced by said clock generator that are applied to said base nine ones counter to a number which is a base nine equivalent of base 10.

* * * * *